United States Patent
Nisha et al.

(10) Patent No.: US 12,540,569 B2
(45) Date of Patent: Feb. 3, 2026

(54) MIXING BODY ASSEMBLY FOR EXHAUST AFTERTREATMENT SYSTEM

(71) Applicant: Cummins Emission Solutions Inc., Columbus, IN (US)

(72) Inventors: Kumari Nisha, Pune (IN); Kiran D Jadhav, Nashik (IN); Tushar Sudam Udhane, Pune (IN); Enoch Nanduru, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/827,159

(22) Filed: Sep. 6, 2024

(65) Prior Publication Data
US 2025/0084778 A1    Mar. 13, 2025

Related U.S. Application Data

(60) Provisional application No. 63/537,051, filed on Sep. 7, 2023.

(51) Int. Cl.
| | |
|---|---|
| *F01N 3/24* | (2006.01) |
| *F01N 3/20* | (2006.01) |
| *F01N 3/28* | (2006.01) |

(52) U.S. Cl.
CPC ............. *F01N 3/24* (2013.01); *F01N 3/2066* (2013.01); *F01N 3/28* (2013.01); *F01N 3/2892* (2013.01);
(Continued)

(58) Field of Classification Search
CPC . F01N 3/2066; F01N 3/24; F01N 3/28; F01N 3/2892; F01N 2240/20; F01N 2610/02; F01N 2610/1453
See application file for complete search history.

(56) References Cited

U.S. PATENT DOCUMENTS

| | | |
|---|---|---|
| 6,722,123 B2 | 4/2004 | Liu et al. |
| 8,079,211 B2 | 12/2011 | Levin et al. |

(Continued)

FOREIGN PATENT DOCUMENTS

| | | | |
|---|---|---|---|
| CN | 219344808 U | * | 7/2023 |
| DE | 10 2008 018 063 A1 | | 11/2008 |

(Continued)

OTHER PUBLICATIONS

International Search Report & Written Opinion in PCT Appl. No. PCT/US2015/010837, dated May 6, 2015, 9 pages.
(Continued)

*Primary Examiner* — Audrey B. Walter
(74) *Attorney, Agent, or Firm* — Foley & Lardner LLP

(57) ABSTRACT

A mixing body assembly for an exhaust aftertreatment system that includes a housing defining an internal volume. The mixing body assembly includes a mixing inlet body that includes an inlet body and a transfer body disposed within the internal volume, coupled to the inlet body, and that receives the exhaust from the inlet body and treatment fluid from an injector of a dosing module. The mixing inlet body includes an extended body disposed within the internal volume, coupled to the transfer body, and that receives the exhaust and the treatment fluid from the transfer body. The extended body includes extended body first and second ends. The extended body second end has a first end portion separated from the extended body first end by a first length, and a second end portion separated from the extended body first end by a second length greater than the first length.

21 Claims, 5 Drawing Sheets

(52) U.S. Cl.
CPC ...... *F01N 2240/20* (2013.01); *F01N 2610/02* (2013.01); *F01N 2610/1453* (2013.01)

(56) References Cited

U.S. PATENT DOCUMENTS

| | | |
|---|---|---|
| 8,114,364 B2 | 2/2012 | Harinath et al. |
| 8,240,137 B2 | 8/2012 | Liu et al. |
| 8,528,319 B2 | 9/2013 | Wilhelm et al. |
| 11,486,289 B2* | 11/2022 | Volmerding ....... B01D 53/9431 |
| 2007/0101703 A1 | 5/2007 | Kanaya et al. |
| 2010/0107614 A1 | 5/2010 | Levin et al. |
| 2010/0139258 A1 | 6/2010 | Hackett et al. |
| 2010/0196225 A1 | 8/2010 | Harinath et al. |
| 2010/0212292 A1 | 8/2010 | Rusch et al. |
| 2011/0030343 A1 | 2/2011 | Kiser et al. |
| 2011/0094206 A1 | 4/2011 | Liu et al. |
| 2011/0099978 A1 | 5/2011 | Davidson et al. |
| 2011/0107743 A1 | 5/2011 | Ranganathan et al. |
| 2011/0131958 A1 | 6/2011 | Adelman et al. |
| 2011/0146253 A1 | 6/2011 | Isada et al. |
| 2011/0146254 A1 | 6/2011 | Yi et al. |
| 2011/0167805 A1 | 7/2011 | Chen |
| 2011/0180347 A1 | 7/2011 | Butler |
| 2012/0090305 A1 | 4/2012 | Floyd et al. |
| 2012/0102920 A1 | 5/2012 | Pipis, Jr. |
| 2012/0174561 A1 | 7/2012 | Troxler et al. |
| 2012/0180457 A1 | 7/2012 | Liu et al. |
| 2012/0324872 A1 | 12/2012 | Jaruvatee et al. |
| 2013/0031891 A1 | 2/2013 | Ponnathpur |
| 2013/0061577 A1 | 3/2013 | Floyd et al. |
| 2013/0213013 A1 | 8/2013 | Mitchell et al. |
| 2015/0101318 A1 | 4/2015 | Munnannur et al. |
| 2015/0354432 A1* | 12/2015 | Gehrlein ............... F01N 3/2892 366/336 |
| 2016/0006111 A1 | 1/2016 | Miskovsk et al. |
| 2016/0084133 A1 | 3/2016 | Sampath et al. |
| 2017/0354934 A1 | 12/2017 | Muruganantham et al. |
| 2021/0017891 A1 | 1/2021 | More et al. |
| 2023/0003159 A1* | 1/2023 | Mittapalli ............ F01N 3/2066 |

FOREIGN PATENT DOCUMENTS

| | | |
|---|---|---|
| EP | 1 748 162 A1 | 1/2007 |
| GB | 2 448 993 A | 11/2008 |
| WO | WO-2011/126930 A2 | 10/2011 |
| WO | WO-2011/163395 A1 | 12/2011 |
| WO | WO-2013/025860 A1 | 2/2013 |
| WO | WO-2016/111701 A1 | 7/2016 |
| WO | WO-2019/194784 A1 | 10/2019 |

OTHER PUBLICATIONS

Non-Final Office Action in U.S. Appl. No. 15/540,910 DTD Apr. 12, 2019.

Notice of Allowance in U.S. Appl. No. 15/540,910 DTD Aug. 2, 2019.

\* cited by examiner

MIXING BODY ASSEMBLY FOR EXHAUST AFTERTREATMENT SYSTEM

CROSS-REFERENCE TO RELATED APPLICATION

This application claims the benefit of and priority to U.S. Provisional Patent Application No. 63/537,051, filed Sep. 7, 2023, which is incorporated herein by reference in its entirety.

TECHNICAL FIELD

The present disclosure relates generally to a mixing body assembly for exhaust aftertreatment systems for an internal combustion engine.

BACKGROUND

The exhaust of internal combustion engines, such as diesel engines, includes nitrogen oxide ($NO_x$) compounds. It is desirable to reduce $NO_x$ emissions to comply with environmental regulations, for example. To reduce $NO_x$ emissions, a treatment fluid may be dosed into the exhaust by a doser assembly within an aftertreatment system. The treatment fluid facilitates conversion of a portion of the exhaust into non-$NO_x$ emissions, such as nitrogen ($N_2$), carbon dioxide ($CO_2$), and water ($H_2O$), thereby reducing $NO_x$ emissions. These aftertreatment systems may include a mixer that facilitates mixing of the treatment fluid and the exhaust.

SUMMARY

In one embodiment, a mixing body assembly for an exhaust aftertreatment system includes a housing defining an internal volume. The housing includes a housing inlet and a housing outlet. The mixing body assembly further includes a mixing inlet body that includes an inlet body extending through the housing inlet. The inlet body couplable to an exhaust conduit. The inlet body includes an inlet body inlet that receives exhaust from the exhaust conduit. The mixing inlet body further includes a transfer body disposed within the internal volume and coupled to the inlet body. The transfer body receives the exhaust from the inlet body and treatment fluid from an injector of a dosing module. The mixing inlet body further includes an extended body disposed within the internal volume and coupled to the transfer body. The extended body receives the exhaust and the treatment fluid from the transfer body. The extended body includes an extended body first end located at the transfer body and an extended body second end opposite the extended body first end. The extended body second end has a first end portion and a second end portion. The first end portion is separated from the extended body first end by a first length. The second end portion is separated from the extended body first end by a second length that is greater than the first length. The second end portion is positioned between the first end portion and the housing outlet.

In some embodiments, the extended body further includes a tapered portion that receives the exhaust and the treatment fluid from the transfer body. The tapered portion includes a tapered portion first end having a first width and a tapered portion second end opposite the tapered portion first end. The tapered portion second end having a second width that is less than the first width. The tapered portion further includes a tapered portion body extending between the tapered portion first end and the tapered portion second end. The extended body further includes a straight portion that receives the exhaust and the treatment fluid from the tapered portion. The straight portion includes a straight portion first end located at the tapered portion second end, a straight portion second end opposite the straight portion first end, and a straight portion body extending between the straight portion first end and the straight portion second end.

In some embodiments, the straight portion first end has the second width.

In some embodiments, the straight portion first end is separated from the first end portion by a third length and the straight portion first end is separated from the second end portion by a fourth length. The fourth length is greater than the third length.

In some embodiments, the tapered portion first end is separated from the tapered portion second end by a fifth length. The fifth length is greater than the third length and lesser than the fourth length.

In some embodiments, the first width is in a range between 110% of the second width and 200% of the second width.

In some embodiments, the tapered portion body and the straight portion body are coaxial.

In some embodiments, the straight portion first end has a third width, the straight portion second end has a fourth width, and the third width is equal to the fourth width.

In some embodiments, the mixing body assembly further includes a guide wall disposed in the transfer body proximate to the housing inlet. The guide wall includes a guide wall first end separated from the housing inlet by a first distance. The guide wall first end has a first width. The guide wall further includes a guide wall second end separated from the housing inlet by a second distance. The second distance being greater than the first distance. The guide wall second end having a second width greater than the first width.

In some embodiments, a portion of the guide wall has a semi-circular cross-section.

In some embodiments, the guide wall first end separated from the extended body first end by a third distance, the guide wall second end separated from the extended body first end by a fourth distance, and the third distance is less than the fourth distance.

In some embodiments, the inlet body is centered on an inlet body central axis, the extended body is centered on an extended body central axis, the inlet body central axis and the extended body central axis extend along a first reference plane, the first reference plane is orthogonal to a second reference plane that is parallel to the inlet body central axis, and the extended body second end is disposed along an outlet plane that is separated from the second reference plane by an acute angle.

In some embodiments, the inlet body central axis is orthogonal to the extended body central axis.

In some embodiments, the mixing body assembly further includes a guide wall disposed in the internal volume. The guide wall receives the exhaust and the treatment fluid from the extended body and directs the exhaust and the treatment fluid toward the housing outlet.

In some embodiments, the housing further includes a first wall substantially coplanar to the housing inlet and a second wall perpendicular to the first wall. The guide wall includes a guide wall first end coupled to the first wall and a guide wall second end coupled to the second wall.

In some embodiments, the housing further includes a third wall perpendicular to the first wall and the second wall, the guide wall includes an edge extending from the guide wall first end to the guide wall second end, the edge faces the third wall, and the mixing body assembly further includes a gap disposed between the edge and the third wall such that the edge and the third wall do not contact.

In some embodiments, the mixing body assembly further includes a flange coupled to the housing and the extended body at the extended body first end.

In some embodiments, an exhaust aftertreatment system includes the mixing body assembly and a dosing module coupled to the housing. The dosing module includes an injector that injects treatment fluid into the transfer body. The injector extends through the housing and the transfer body.

In another embodiment, a mixing body assembly for an exhaust aftertreatment system includes a housing defining an internal volume. The mixing body assembly further includes a mixing inlet body that includes an inlet body that couples to an exhaust conduit and receives exhaust from the exhaust conduit. The inlet body extends away from the internal volume. The inlet body is centered on an inlet body central axis that extends along a first reference plane. The mixing inlet body further includes a transfer body disposed within the internal volume and coupled to the inlet body. The transfer body receives the exhaust from the inlet body and treatment fluid from an injector of a dosing module. The mixing inlet body further includes an extended body disposed within the internal volume and coupled to the transfer body. The extended body receives the exhaust and the treatment fluid from the transfer body. The extended body us centered on an extended body central axis that extends along the first reference plane. The extended body includes an extended body first end located at the transfer body and an extended body second end opposite the extended body first end. The extended body second end is disposed along an outlet plane that is separated from a second reference plane by an acute angle. The second reference plane is parallel to the inlet body central axis and orthogonal to the first reference plane.

In yet another embodiment, a mixing inlet body for an exhaust aftertreatment system includes an inlet body that couples to an exhaust conduit. The inlet body includes an inlet body inlet that receives exhaust from the exhaust conduit. The mixing inlet body further includes a transfer body coupled to the inlet body. The transfer body receives the exhaust from the inlet body and treatment fluid from an injector of a dosing module. The mixing inlet body further includes a tapered portion coupled to the transfer body. The tapered portion receives the exhaust and the treatment fluid from the transfer body. The mixing inlet body further includes a straight portion coupled to the tapered portion. The straight portion receives the exhaust and the treatment fluid from the tapered portion. The straight portion includes a straight portion first end located at the tapered portion and a straight portion second end opposite the straight portion first end. The straight portion second end being angled relative to the straight portion first end.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
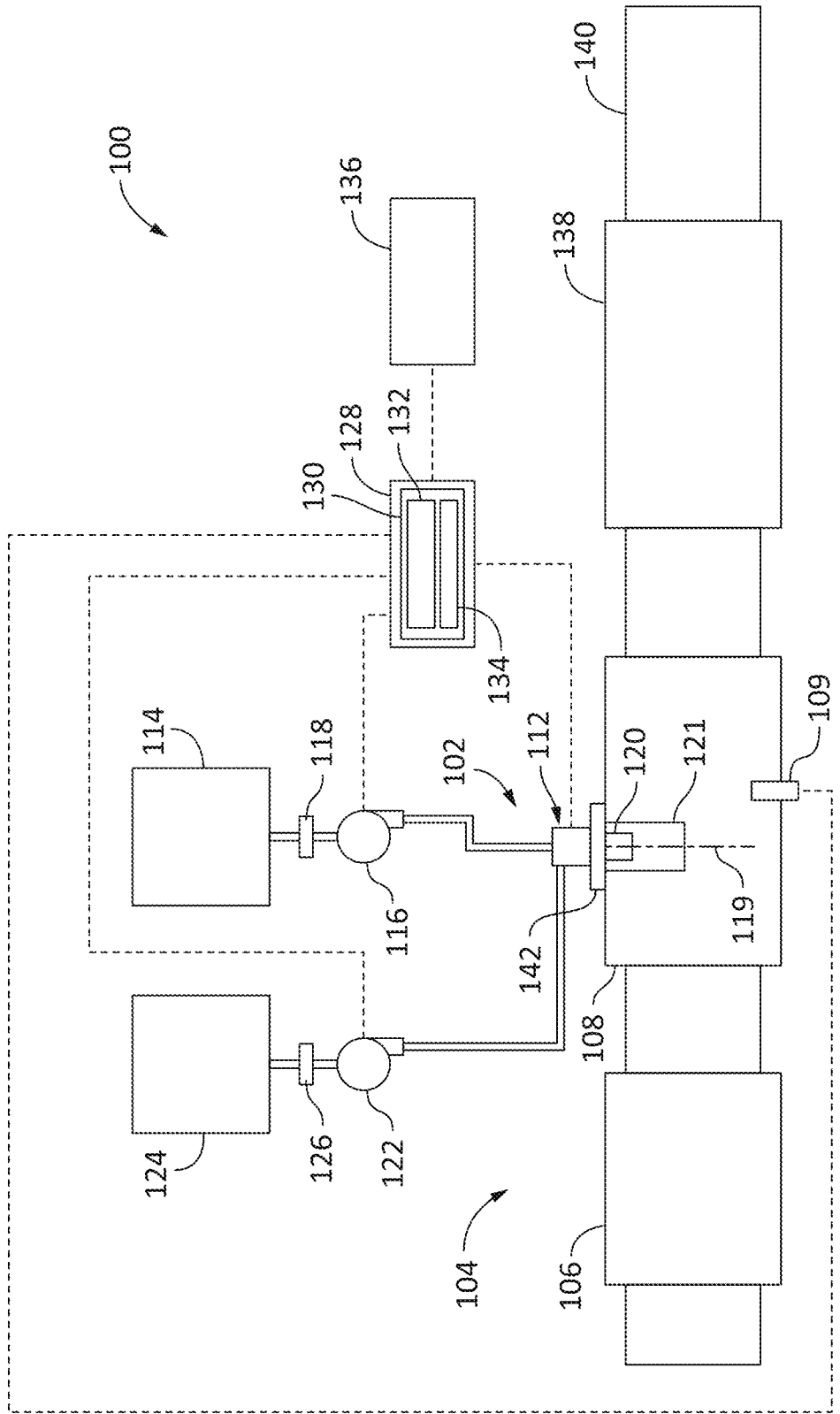
FIG. 1 is a block schematic diagram of an example exhaust aftertreatment system.
Figure 2:
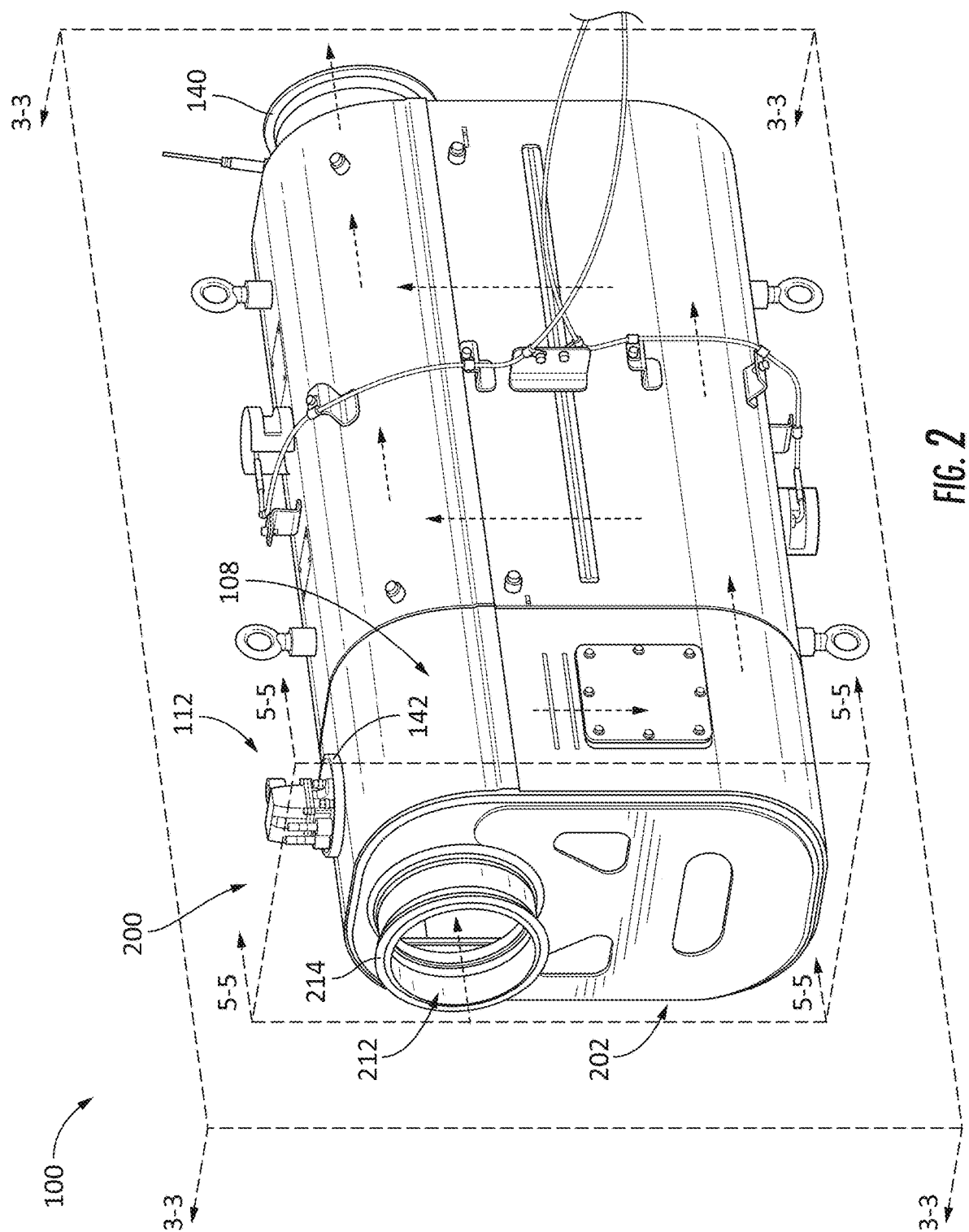
FIG. 2 is a perspective view of a portion of the exhaust aftertreatment system of FIG. 1.
Figure 3:
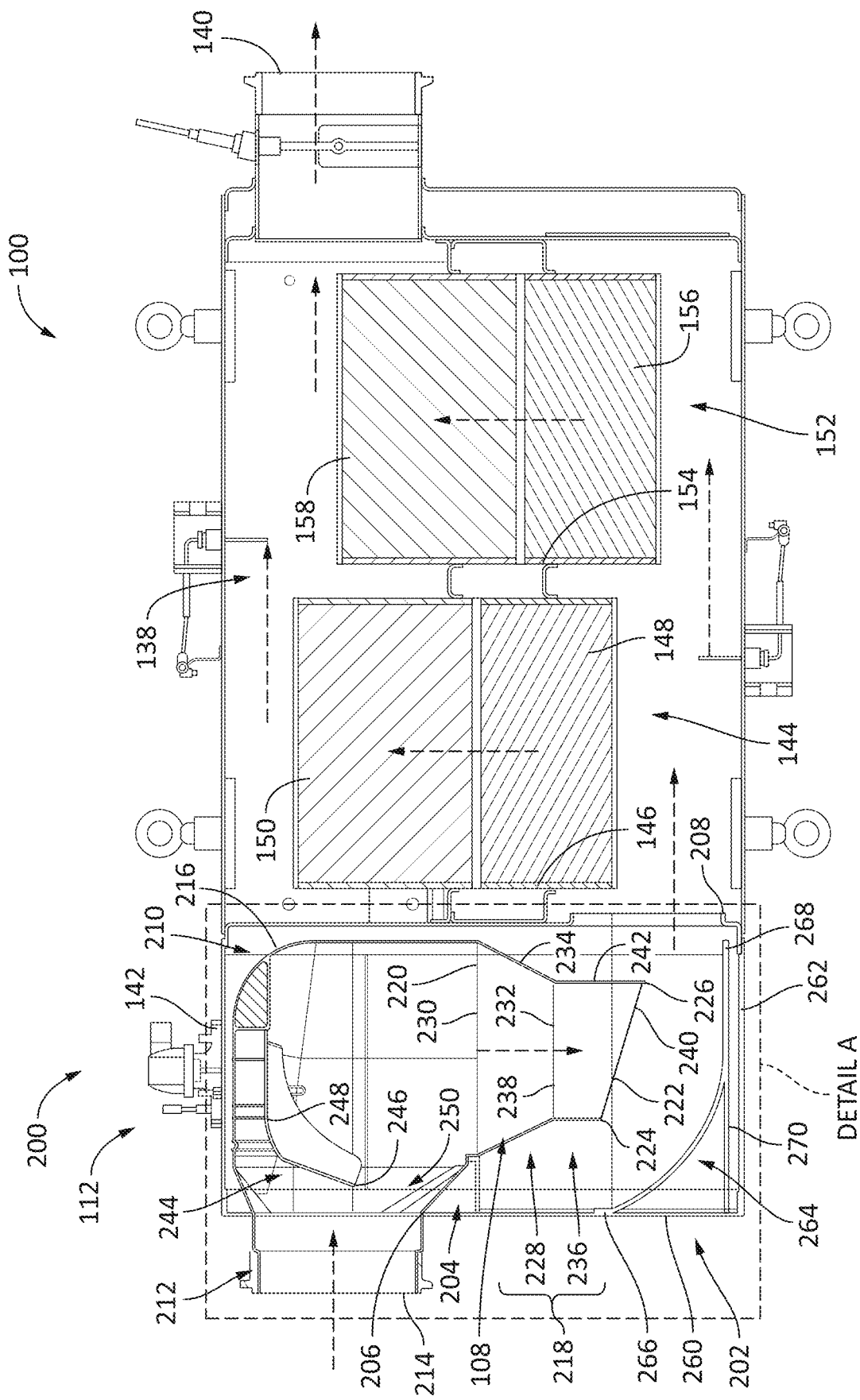
FIG. 3 is a cross-sectional view of the portion of the exhaust aftertreatment system of FIG. 2 taken along plane 3-3 in FIG. 2.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a mixing body assembly for an exhaust aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that is often treated by a doser assembly within an exhaust aftertreatment system. The doser assembly typically treats exhaust using a treatment fluid (e.g., reductant, a hydrocarbon fluid, etc.) released from the doser assembly by an injector of a doser. The treatment fluid, such as the reductant, may be adsorbed by a catalyst member and may function to reduce $NO_x$ in the exhaust. The treatment fluid, such as the hydrocarbon fluid, may increase a temperature of the exhaust to facilitate regeneration of components, such as a particulate filter or the catalyst member, of the exhaust aftertreatment system. The doser assembly is mounted on a component of the exhaust aftertreatment system. For example, the doser assembly may be mounted on a decomposition reactor, an exhaust conduit, a panel, a housing, or other similar components of the exhaust aftertreatment system.

Mixing the exhaust with the treatment fluid may improve the reduction of NOx in the exhaust. A device can be used to facilitate mixing between the exhaust and the treatment fluid. The device can cause turbulent flow (e.g., turbulence, etc.) including swirling (e.g., eddies, etc.) and can improve mixing of the exhaust and the treatment fluid. For example, swirling of the exhaust causes dispersal of treatment fluid within the exhaust, thereby improving the mixing between the exhaust and the treatment fluid. Additionally, the device can increase an amount of time the exhaust and the treatment fluid interact in order to further facilitate mixing between the exhaust and the treatment fluid. However, the device may be prone to collecting (e.g., accumulating, etc.) deposits of the treatment fluid because the device is in a flow path of the treatment fluid. These deposits may reduce a mixing efficiency of the device and/or may decrease a flow rate of the exhaust and treatment fluid, thereby increasing backpressure on an internal combustion engine associated with the aftertreatment system. Increased backpressure is associated with reduced performance and/or efficiency of the internal combustion engine.

Implementations herein are directed to a mixing body assembly that includes an extended body configured to receive exhaust and treatment fluid. The extended body includes an extended body first end and an extended body second end opposite the extended body first end. The extended body second end has a first end portion that is separated from the extended body first end by a first length. The extended body second end also has a second end portion separated from the extended body first end by a second length greater than the first length. The second length being greater than the first length may prevent or minimize an amount of the exhaust and the treatment fluid flowing out of the extended body and directly towards an outlet of a housing that the extended body is disposed within. The second length being greater than the first length may also encourage the exhaust and the treatment fluid to flow within an internal volume of the housing for a longer period of time, thereby enhancing mixing of the exhaust and the treatment fluid, before exiting through the outlet.

The extended body may include a tapered portion that includes a tapered portion first end having a first width and a tapered portion second end opposite the tapered portion first end. The tapered portion second end has a second width lesser than the first width, thereby increasing a velocity of the exhaust and the treatment fluid through the tapered portion. The increase in the velocity of the exhaust and the treatment fluid through the tapered portion may mitigate formation of deposits of the treatment fluid within the tapered portion and/or the internal volume of the housing, thereby enhancing a mixing efficiency of the mixing body assembly.

The mixing body assembly may include a first guide wall disposed in the transfer body proximate an inlet of the housing and configured to receive the exhaust from the inlet. The first guide wall may be configured to swirl and/or disperse the exhaust (i.e., increase turbulence of the exhaust), thereby enhancing an ability of the exhaust to mix with the treatment fluid downstream of the first guide wall. The mixing body assembly may include a second guide wall proximate the outlet of the housing. The second guide wall may direct a flow of the exhaust and the treatment fluid within the internal volume of the housing.

II. Overview of Exhaust Aftertreatment Systems

FIG. 1 depicts an exhaust aftertreatment system 100 configured to treat an exhaust released by an internal combustion engine. The exhaust aftertreatment system 100 includes an exhaust conduit system 104 configured to receive the exhaust from the internal combustion engine. The exhaust aftertreatment system 100 further includes a particulate filter 106 (e.g., a diesel particulate filter (DPF), etc.) coupled to the exhaust conduit system 104 and configured to (e.g., structured to, able to, etc.) remove particulate matter, such as soot, from the exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The exhaust aftertreatment system 100 further includes a decomposition chamber 108 (e.g., reactor, reactor pipe, conduit, etc.) disposed downstream of the particulate filter 106. The decomposition chamber 108 is configured to receive the exhaust from the particulate filter 106. The exhaust aftertreatment system 100 further includes a treatment fluid delivery system 102 coupled to the decomposition chamber 108. The treatment fluid delivery system 102 is configured to deliver treatment fluid to the decomposition chamber 108. The treatment fluid may be, for example, a reductant (e.g., urea, diesel exhaust fluid (DEF), Adblue®, a urea water solution (UWS), an aqueous urea solution (e.g., AUS32, etc.), and/or other similar fluids) or a hydrocarbon fluid (e.g., fuel, oil, additive, etc.). When the reductant is introduced into the exhaust, reduction of emission of undesirable components (e.g., $NO_x$, etc.) in the exhaust may be facilitated. When the hydrocarbon fluid is introduced into the exhaust, the temperature of the exhaust may be increased (e.g., to facilitate regeneration of components of the exhaust aftertreatment system 100, etc.). For example, the exhaust aftertreatment system 100 may include a spark plug 109 (e.g., igniter, etc.) configured to increase the temperature of the exhaust by combusting the hydrocarbon fluid within the exhaust. The decomposition chamber 108 includes an inlet in fluid communication with the particulate filter 106 to receive the exhaust containing $NO_x$ emissions and an outlet for the exhaust, $NO_x$ emissions, ammonia, and/or the treatment fluid to flow to downstream components of the exhaust aftertreatment system 100.

The treatment fluid delivery system 102 includes a doser assembly 112 (e.g., dosing module, etc.) configured to dose the treatment fluid into the decomposition chamber 108 (e.g., via an injector). The doser assembly 112 is mounted to the decomposition chamber 108 such that the doser assembly 112 may dose the treatment fluid into the exhaust flowing through the exhaust conduit system 104.

The doser assembly 112 is fluidly coupled to (e.g., fluidly configured to communicate with, etc.) a treatment fluid source 114. The treatment fluid source 114 may include multiple treatment fluid sources 114. The treatment fluid source 114 may be, for example, a diesel exhaust fluid tank containing Adblue®. A treatment fluid pump 116 (e.g., supply unit, etc.) is used to pressurize the treatment fluid from the treatment fluid source 114 for delivery to the doser assembly 112. In some embodiments, the treatment fluid pump 116 is pressure-controlled (e.g., controlled to obtain a target pressure, etc.). The treatment fluid pump 116 may include a treatment fluid filter 118. The treatment fluid filter 118 filters (e.g., strains, etc.) the treatment fluid prior to the treatment fluid being provided to internal components (e.g., pistons, vanes, etc.) of the treatment fluid pump 116. For example, the treatment fluid filter 118 may inhibit or prevent the transmission of solids (e.g., solidified treatment fluid, contaminants, etc.) to the internal components of the treatment fluid pump 116. In this way, the treatment fluid filter 118 may facilitate prolonged desirable operation of the treatment fluid pump 116. In some embodiments, the treatment fluid pump 116 is coupled (e.g., fastened, attached, affixed, welded, etc.) to a chassis of a vehicle associated with the exhaust aftertreatment system 100.

The doser assembly 112 includes at least one injector 120. Each injector 120 is configured to dose the treatment fluid into the exhaust (e.g., within the decomposition chamber 108, etc.) at an injection axis 119. The exhaust aftertreatment system 100 may include a mixer 121 (e.g., a mixing body assembly, a swirl generating device, a vane plate, inlet plate, deflector plate, etc.). In some embodiments, at least a portion of the mixer 121 may be located within the decomposition chamber 108. In further embodiments, at least a portion of the mixer 121 may also be located in a conduit of the exhaust conduit system 104 (e.g., a conduit upstream of the decomposition chamber 108, etc.). The mixer 121 is configured to receive exhaust from the decomposition chamber 108 and the treatment fluid from the injector 120. The mixer 121 is also configured to facilitate mixing of the exhaust and the treatment fluid. The mixer 121 is configured to facilitate swirling (e.g., tumbling, rotation, etc.) of the exhaust and/or the treatment fluid and mixing (e.g., combination, etc.) of the exhaust and the treatment fluid so as to disperse the treatment fluid within the exhaust downstream of the mixer 121. By dispersing the treatment fluid within the exhaust (e.g., to obtain an increased uniformity index, etc.) using the mixer 121, reduction of emission of undesirable components in the exhaust is enhanced.

In some embodiments, the injection axis 119 extends into the mixer 121. The injection axis 119 may extend into the mixer 121 at an angle relative to a central axis of the mixer 121. For example, in some embodiments, the injection axis 119 may be substantially coincident with a central axis of the mixer 121. In other embodiments, the injection axis 119 may be substantially perpendicular to the central axis of the mixer 121. In yet other embodiment, the injection axis 119 may be substantially parallel to the central axis of the mixer 121.

In some embodiments, the injector 120 is not directly coupled to the mixer 121. In these embodiments, the injector 120 and the mixer 121 may each be coupled to a same component (e.g., housing, panel, chamber, body, etc.). In other embodiments, the injector 120 is directly coupled to the mixer 121. In these embodiments, the injector 120 and the mixer 121 may also each be coupled to the same component. In some embodiments, the injector 120 is not disposed within the mixer 121. In other embodiments, the injector 120 may be at least partially disposed within the mixer 121.

In some embodiments, the treatment fluid delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the doser assembly 112 via a conduit. In these embodiments, the doser assembly 112 is configured to mix the air and the treatment fluid into an air-treatment fluid mixture and to provide the air-treatment fluid mixture into the decomposition chamber 108. In other embodiments, the treatment fluid delivery system 102 does not include the air pump 122, the air source 124, and/or the air filter 126. In such embodiments, the doser assembly 112 is not configured to mix the treatment fluid with the air.

The spark plug 109, the doser assembly 112, and the treatment fluid pump 116 are also electrically or communicatively coupled to a treatment fluid delivery system controller 128. The treatment fluid delivery system controller 128 may control the spark plug 109 to ignite the treatment fluid in the decomposition chamber 108. The treatment fluid delivery system controller 128 controls the doser assembly 112 to dose the treatment fluid into the decomposition chamber 108. The treatment fluid delivery system controller 128 may also control the treatment fluid pump 116.

The treatment fluid delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the treatment fluid delivery system controller 128 can read instructions. The instructions may include code from any suitable programming language. The memory 134 may include various modules that include instructions which are configured to be implemented by the processor 132.

In various embodiments, the treatment fluid delivery system controller 128 is configured to communicate with a central controller 136 (e.g., engine control unit (ECU), engine control module (ECM), etc.) of an internal combustion engine having the exhaust aftertreatment system 100. In some embodiments, the central controller 136 and the treatment fluid delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the treatment fluid delivery system 102.

The exhaust aftertreatment system 100 further includes a catalyst member 138 (e.g., SCR (Selective Catalytic Reduction) catalyst member, etc.) disposed downstream of the decomposition chamber 108. As a result, the treatment fluid is injected upstream of the catalyst member 138 such that the catalyst member 138 receives a mixture of the treatment fluid and exhaust. The treatment fluid droplets undergo the processes of evaporation, thermolysis, and hydrolysis to form non-$NO_x$ emissions (e.g., gaseous ammonia, etc.) within the exhaust conduit system 104.

The catalyst member 138 includes an inlet in fluid communication with the decomposition chamber 108 from which exhaust and treatment fluid are received and an outlet in fluid communication with an outlet 140 of the exhaust conduit system 104. The outlet 140 may release the treated exhaust into an ambient environment or another treatment system.

The exhaust aftertreatment system 100 may further include an oxidation catalyst member (e.g., a diesel oxidation catalyst (DOC), ammonia oxidation catalyst ($AMO_x$), etc.) in fluid communication with the exhaust conduit system 104 (e.g., downstream of the catalyst member 138, upstream of the particulate filter 106, upstream of the decomposition chamber 108, etc.) to oxidize hydrocarbons and carbon monoxide in the exhaust.

In some implementations, the particulate filter 106 may be positioned downstream of the decomposition chamber 108. For instance, the particulate filter 106 and the catalyst member 138 may be combined into a single unit. In some implementations, the doser assembly 112 may instead be positioned downstream of a turbocharger or upstream of the turbocharger.

The exhaust aftertreatment system 100 may further include a doser mounting bracket 142 (e.g., mounting bracket, coupler, plate, etc.). The doser mounting bracket 142 couples the doser assembly 112 to a component of the exhaust aftertreatment system 100 (e.g., the decomposition chamber 108, etc.). The doser mounting bracket 142 may be configured as an insulator (e.g., vibrational insulator, thermal insulator, etc.). For example, the doser mounting bracket 142 may be configured to mitigate the transfer of heat from the exhaust passing through the exhaust conduit system 104 to the doser assembly 112. In this way, the doser assembly 112 is capable of operating more efficiently and desirably. The doser mounting bracket 142 may be configured to mitigate transfer of vibrations from the component of the exhaust aftertreatment system 100 to the doser assembly 112. Additionally, the doser mounting bracket 142 is configured to aid in reliable installation of the doser assembly 112. This may decrease manufacturing costs associated with the exhaust aftertreatment system 100 and ensure repeated desirable installation of the doser assembly 112.

In various embodiments, the doser mounting bracket 142 couples the doser assembly 112 to the decomposition chamber 108. In some embodiments, the doser mounting bracket 142 couples the doser assembly 112 to an exhaust conduit of the exhaust conduit system 104. For example, the doser mounting bracket 142 may couple the doser assembly 112 to an exhaust conduit of the exhaust conduit system 104 that is upstream of the decomposition chamber 108. In some embodiments, the doser mounting bracket 142 couples the doser assembly 112 to the particulate filter 106 and/or the catalyst member 138. The location of the doser mounting bracket 142 may be varied depending on the application of the exhaust aftertreatment system 100. For example, in some exhaust aftertreatment systems 100, the doser mounting bracket 142 may be located further upstream than in other exhaust aftertreatment systems 100. Furthermore, some exhaust aftertreatment systems 100 may include multiple doser assemblies 112 and therefore may include multiple doser mounting brackets 142.

III. Overview of Example Mixing Body Assemblies

FIGS. 2-5 illustrates an embodiment of the exhaust aftertreatment system 100, where a flow direction of the exhaust is shown by dashed lines. In these embodiments, the catalyst member 138 includes a first catalyst assembly 144. The first catalyst assembly 144 includes a first catalyst housing 146 (e.g., shell, body, etc.). The first catalyst assembly 144 further includes a first catalyst substrate 148 and a second catalyst substrate 150 coupled to the first catalyst housing 146. The second catalyst substrate 150 is disposed downstream of the first catalyst substrate 148. The first catalyst substrate 148 is different from the second catalyst substrate 150. For example, the first catalyst substrate 148 may be a SCR catalyst substrate and the second catalyst substrate 150 may be an ammonia oxidation catalyst substrate.

The catalyst member 138 may further include a second catalyst assembly 152. The second catalyst assembly 152 includes a second catalyst housing 154. The second catalyst assembly 152 further includes a third catalyst substrate 156 and a fourth catalyst substrate 158 coupled to the second catalyst housing 154. The fourth catalyst substrate 158 is disposed downstream of the third catalyst substrate 156. The third catalyst substrate 156 is different from the fourth catalyst substrate 158. For example, the third catalyst substrate 156 may be a SCR catalyst substrate and the fourth catalyst substrate 158 may be an ammonia oxidation catalyst substrate.

In these embodiments, illustrated in FIGS. 2-5, the exhaust aftertreatment system 100 also includes a mixing body assembly 200 (e.g., the mixer 121, etc.) configured to facilitate mixing of the exhaust and the treatment fluid. The mixing body assembly 200 includes a housing 202 that defines an internal volume 204. The doser assembly 112 is coupled to the housing 202 via the doser mounting bracket 142 and the injector 120 is configured to provide the treatment fluid into the housing 202. In some embodiments, the housing 202 may include an injector aperture configured to receive the injector 120 when the doser assembly 112 is coupled to the housing 202. The housing 202 includes a housing inlet 206 configured to receive the exhaust and a housing outlet 208 configured to release the exhaust and the treatment fluid.

The mixing body assembly 200 further includes a mixing inlet body 210 (e.g., frame, etc.). The mixing inlet body 210 includes an inlet body 212 extending through the housing inlet 206. The inlet body 212 is fluidly coupled to the internal combustion engine and configured to receive the exhaust from the internal combustion engine. In some embodiments, the inlet body 212 is configured to be coupled to an exhaust conduit that is fluidly coupled to internal combustion engine and configured to transmit the exhaust from the internal combustion engine. The inlet body 212 includes an inlet body inlet 214 that is configured to receive the exhaust from the exhaust conduit and/or the internal combustion engine. The inlet body 212 may be centered on an inlet body central axis 215.

The mixing inlet body 210 further includes a transfer body 216. The transfer body 216 is disposed within the internal volume 204 and coupled to the inlet body 212. The transfer body 216 is configured to receive the exhaust from the inlet body 212 and the treatment fluid from the injector 120 of the doser assembly 112.

The mixing inlet body 210 further includes an extended body 218. The extended body 218 is disposed within the internal volume 204 and coupled to the transfer body 216. The extended body 218 is configured to receive the exhaust and the treatment fluid from the transfer body 216. The extended body 218 includes an extended body first end 220 located at the transfer body 216 and an extended body second end 222 opposite the extended body first end 220. The mixing body assembly 200 may include a first flange 221 coupled to the housing 202 and the extended body 218 at the extended body first end 220. The mixing body assembly 200 may also include a second flange 223 coupled to the housing 202 and the extended body 218 at the extended body first end 220. The first flange 221 and the second flange 223 may couple the mixing inlet body 210 and/or components of the mixing inlet body 210 (e.g., the transfer body 216, the extended body 218, etc.) to the housing 202. The extended body second end 222 has a first end portion 224 and a second end portion 226 positioned between the first end portion 224 and the housing outlet 208. The extended body 218 may be centered on an extended body central axis 227.

Figure 4:
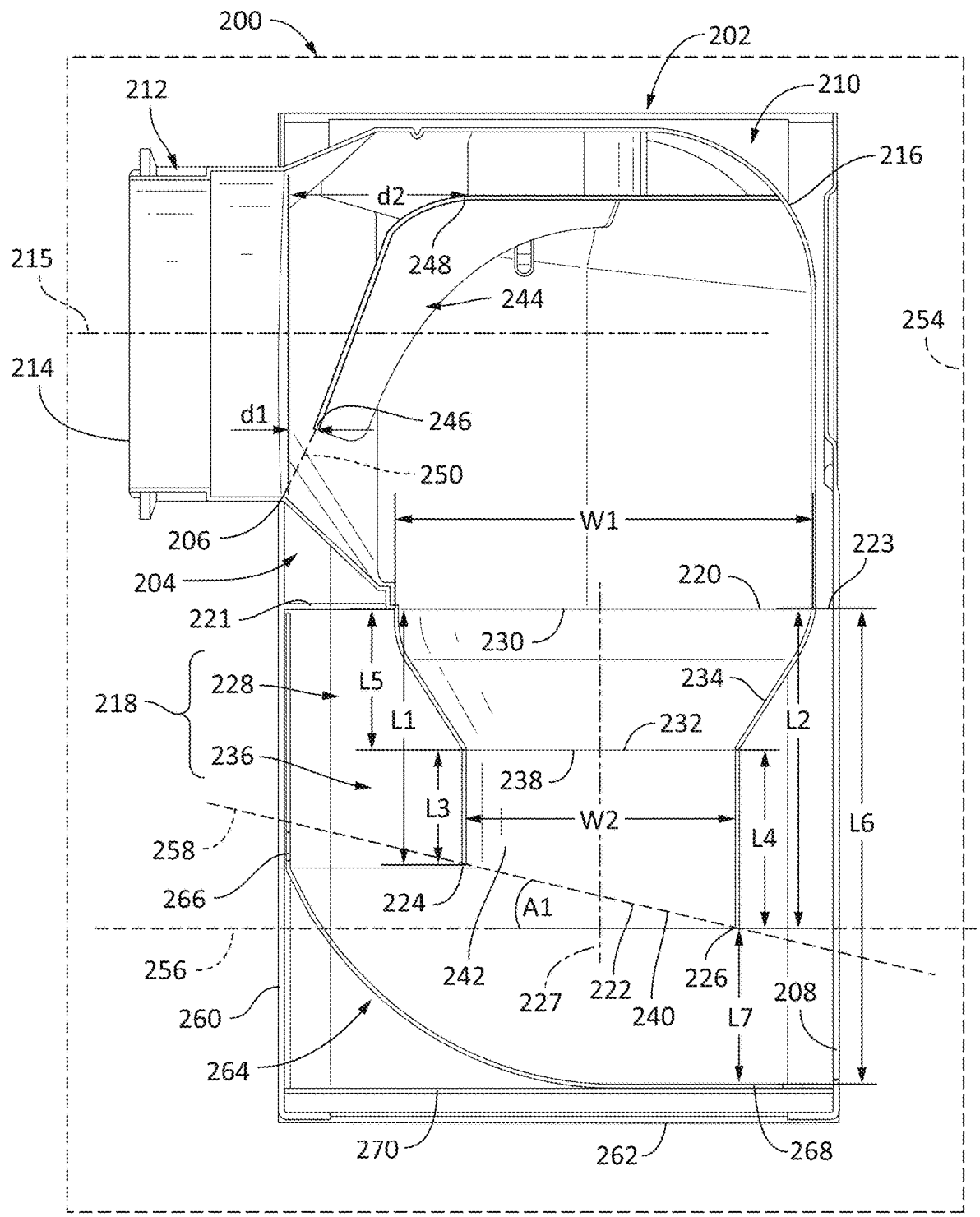
FIG. 4 is a view of Detail A in FIG. 3.

As illustrated in FIG. 4, the first end portion 224 is separated from the extended body first end 220 by a first length L1. The first length L1 is a shortest length between the first end portion 224 and the extended body first end 220 in a direction parallel to the extended body central axis 227. In some embodiments, the first length L1 is in a range of 100 mm to 180 mm, and more preferably 120 mm to 160 mm. The second end portion 226 is separated from the extended body first end 220 by a second length L2 in a direction parallel to the extended body central axis 227. The second length L2 is greater than the first length L1. The second length L2 is a shortest length between the second end portion 226 and the extended body first end 220. In some embodiments, the second length L2 is in a range of 150 mm to 230 mm, and more preferably 170 mm to 210 mm.

The second length L2 (e.g., length between the extended body first end 220 and the second end portion 226 of the extended body second end 222) being greater than the first length L1 may prevent or minimize an amount of the exhaust and the treatment fluid flowing out of the extended body 218 and directly towards the housing outlet 208. The second length L2 being greater than the first length L1 may encourage the exhaust and the treatment fluid to flow within the internal volume 204 for a longer period of time, thereby enhancing mixing of the exhaust and the treatment fluid, before exiting through the housing outlet 208.

The extended body 218 further includes a tapered portion 228 configured to receive the exhaust and the treatment fluid from the transfer body 216. The tapered portion 228 includes a cross-sectional width (e.g., a diameter where a cross-sectional shape is circular) that decreases over a length of the tapered portion 228. The tapered portion 228 includes a tapered portion first end 230 having a first width W1. The tapered portion first end 230 may be at the extended body first end 220. As utilized herein, the term "width" connotes a length of a chord passing through a center point of a shape (e.g., square, rectangle, hexagon, circle, ellipse, pentagon, triangle, etc.).

The tapered portion 228 further includes a tapered portion second end 232 opposite the tapered portion first end 230. The tapered portion second end 232 having a second width W2 that is less than the first width W1, thereby increasing a velocity of the exhaust and the treatment fluid through the tapered portion 228 (i.e., a first velocity of the exhaust and the treatment fluid at the tapered portion first end 230 is lesser than a second velocity of the exhaust and treatment fluid at the tapered portion second end 232).

The first width W1 is associated with a first cross-sectional area of the tapered portion 228 and the second width W2 is associated with a second cross-sectional area of the tapered portion 228. The second cross-sectional area is smaller than the first cross-sectional area, which results in the Venturi effect where the velocity of the fluid at the second cross-sectional area is greater than the velocity of the fluid at the first cross-sectional area. The increase in the velocity of the exhaust and the treatment fluid through the tapered portion 228 may mitigation formation of deposits (e.g., collections, accumulations, etc.) of the treatment fluid within the tapered portion 228 and/or the internal volume 204. These deposits may reduce a mixing efficiency of the mixing body assembly 200 and/or may decrease a flow rate of the exhaust and treatment fluid, thereby increasing backpressure on an internal combustion engine associated with the exhaust aftertreatment system 100. Increased backpressure is associated with reduced performance and/or efficiency of the internal combustion engine.

In some embodiments, the first width W1 is in a range between approximately (e.g., within 5%, etc.) 110% of the second width W2 (e.g., 104.5% of the second width W2, 115.5% of the second width W2, etc.) and approximately 200% of the second width W2 (e.g., 190% of the second width W2, 210% of the second width W2, etc.). In some embodiments, the first width W1 is in a range of 235 mm to 315 mm, and more preferably 255 mm to 295 mm. In some embodiments, the second width W2 is in a range of 125 mm to 205 mm, and more preferably 145 mm to 185 mm. The tapered portion 228 further includes a tapered portion body 234 extending between the tapered portion first end 230 and the tapered portion second end 232.

The extended body 218 further includes a straight portion 236 configured to receive the exhaust and the treatment fluid from the tapered portion 228. The straight portion 236 includes a straight portion first end 238 located at the tapered portion second end 232. In some embodiments, the straight portion first end 238 has the second width W2. The straight portion 236 further includes a straight portion second end 240 opposite the straight portion first end 238. The straight portion second end 240 may be at the extended body second end 222. The straight portion 236 further includes a straight portion body 242 extending between the straight portion first end 238 and the straight portion second end 240. In some embodiments, the tapered portion body 234 and the straight portion body 242 are coaxial such that the exhaust and the treatment fluid may flow smoothly, and provides higher velocity swirling, from the tapered portion body 234 to the straight portion body 242.

In some embodiments, the straight portion first end 238 is separated from the first end portion 224 by a third length L3 and the straight portion first end 238 is separated from the second end portion 226 by a fourth length L4 that is greater than the third length L3. The third length L3 and the fourth length L4 extend in a direction parallel to the extended body central axis 227. In some embodiments, the third length L3 is in a range of 15 mm to 95 mm, and more preferably 35 mm to 75 mm. In some embodiments, the fourth length L4 is in a range of 65 mm to 145 mm, and more preferably 85 mm to 125 mm.

In some embodiments, the tapered portion first end 230 is separated from the tapered portion second end 232 by a fifth length L5 that is greater than the third length L3 and lesser than the fourth length L4. The fifth length L5 extends in a direction parallel to the extended body central axis 227. In some embodiments, the fifth length L5 is in a range of 45 mm to 125 mm, and more preferably 65 mm to 105 mm.

The mixing body assembly 200 further includes a first guide wall 244 (e.g., panel, plate, etc.). The first guide wall 244 is disposed in the transfer body 216 proximate the housing inlet 206 and configured to receive the exhaust from the housing inlet 206. The first guide wall 244 may be configured to swirl and/or disperse the exhaust (i.e., increase turbulence of the exhaust (e.g., increase Reynolds number of the exhaust, etc.)), thereby enhancing an ability of the exhaust to mix with the treatment fluid downstream of the first guide wall 244. The exhaust flows across the first guide wall 244 and is caused to disperse due to the first guide wall 244 intersecting a flow direction of the exhaust. The exhaust may be caused to swirl by the first guide wall 244 due to a cross-sectional shape of the first guide wall 244. For example, the first guide wall 244 may have a semi-circular cross-section that increases swirling of the exhaust. Additionally, or alternatively, the first guide wall 244 may include a convex cross-section that increase swirling of the exhaust.

The first guide wall 244 includes a first guide wall first end 246 having a first distance d1 from the housing inlet 206. The first distance d1 is in a direction parallel to the inlet body central axis 215. In some embodiments, the first distance d1 is in a range of 5 mm to 25 mm, and more preferably 10 mm to 20 mm. The first guide wall first end 246 has a third width W3. In some embodiments, the third width W3 is in a range of 90 mm to 130 mm, and more preferably 95 mm to 125 mm. The first guide wall 244 further includes a first guide wall second end 248 having a second distance d2 from the housing inlet 206. The second distance d2 is in a direction parallel to the inlet body central axis 215. The second distance d2 may be greater than the first distance d1. In some embodiments, the second distance d2 is in a range of 70 mm to 150 mm, and more preferably 90 mm to 130 mm. The first guide wall second end 248 has a fourth width W4 greater than the third width W3 of the first guide wall first end 246.

In some embodiments, the fourth width W4 is in a range of 110 mm to 190 mm, and more preferably 130 mm to 170 mm.

The mixing body assembly 200 defines a guide wall gap 250 between the first guide wall first end 246 and the housing inlet 206. A portion of the exhaust entering the inlet body inlet 214 flows through the guide wall gap 250 and directly to the extended body first end 220. This portion of the exhaust does not flow around the first guide wall 244, but rather flows under the first guide wall 244 and drives flow of the exhaust that does flow around the first guide wall 244 to the extended body first end 220.

The inlet body central axis 215 and the extended body central axis 227 extend along a first reference plane 254. The first reference plane 254 is orthogonal to a second reference plane 256 that is parallel to the inlet body central axis 215. In some embodiments, the extended body second end 222 (e.g., the straight portion second end 240) is planar. In these embodiments, the extended body second end 222 is disposed along an outlet plane 258 that defines an acute angle A1 relative to the second reference plane 256. The acute angle A1 is greater than 0 degrees and lesser than 90 degrees. In some examples, the acute angle A1 is between approximately 10 degrees and approximately 30 degrees (e.g., approximately 20 degrees, approximately 17 degrees, etc.). In other embodiments, the extended body second end 222 is nonplanar. The third width W3 and the fourth width W4 may extend in a direction parallel to the second reference plane 256.

In some embodiments, the inlet body central axis 215 is orthogonal to the extended body central axis 227 on the first reference plane 254. The geometric relationship (i.e., orthogonal relationship) between the inlet body central axis 215 and the extended body central axis 227 may allow the mixing inlet body 210 to be compact in size while also providing a conduit length (i.e., minimum distance the exhaust and/or the exhaust and the treatment fluid must travel) that provides sufficient mixing between the exhaust and the treatment fluid.

The housing 202 includes a first wall 260 and a second wall 262. In some embodiments, the second wall 262 is perpendicular to the first wall 260. The first wall 260 and the housing inlet 206 may be substantially coplanar. The mixing body assembly 200 further includes a second guide wall 264 disposed in the internal volume 204. The second guide wall 264 is configured to receive the exhaust and the treatment fluid from the extended body 218. The second guide wall 264 may harness the entry of the exhaust and the treatment fluid to cause rotation of the exhaust and the treatment fluid within the internal volume 204 to facilitate mixing of the exhaust and the treatment fluid within the internal volume 204 and downstream of the mixing body assembly 200 (e.g., other components of the exhaust aftertreatment system 100, etc.). The second guide wall 264 may direct the exhaust and the treatment fluid from the extended body 218 toward the housing outlet 208.

The second guide wall 264 includes a second guide wall first end 266 coupled to the first wall 260 and a second guide wall second end 268 coupled to the second wall 262. In some embodiments, the second guide wall second end 268 is indirectly coupled to the second wall 262. For example, the mixing body assembly 200 may include a third guide wall 270 disposed in the internal volume 204 below the second guide wall 264 and coupled to the second wall 262, and the second guide wall second end 268 may be indirectly coupled to the second wall 262 by being directly coupled to the third guide wall 270. The third guide wall 270 may extend from the first wall 260 in a direction towards the housing outlet 208. The third guide wall 270 may be perpendicular to the first wall 260. The third guide wall 270 and the second wall 262 may be parallel.

Figure 5:
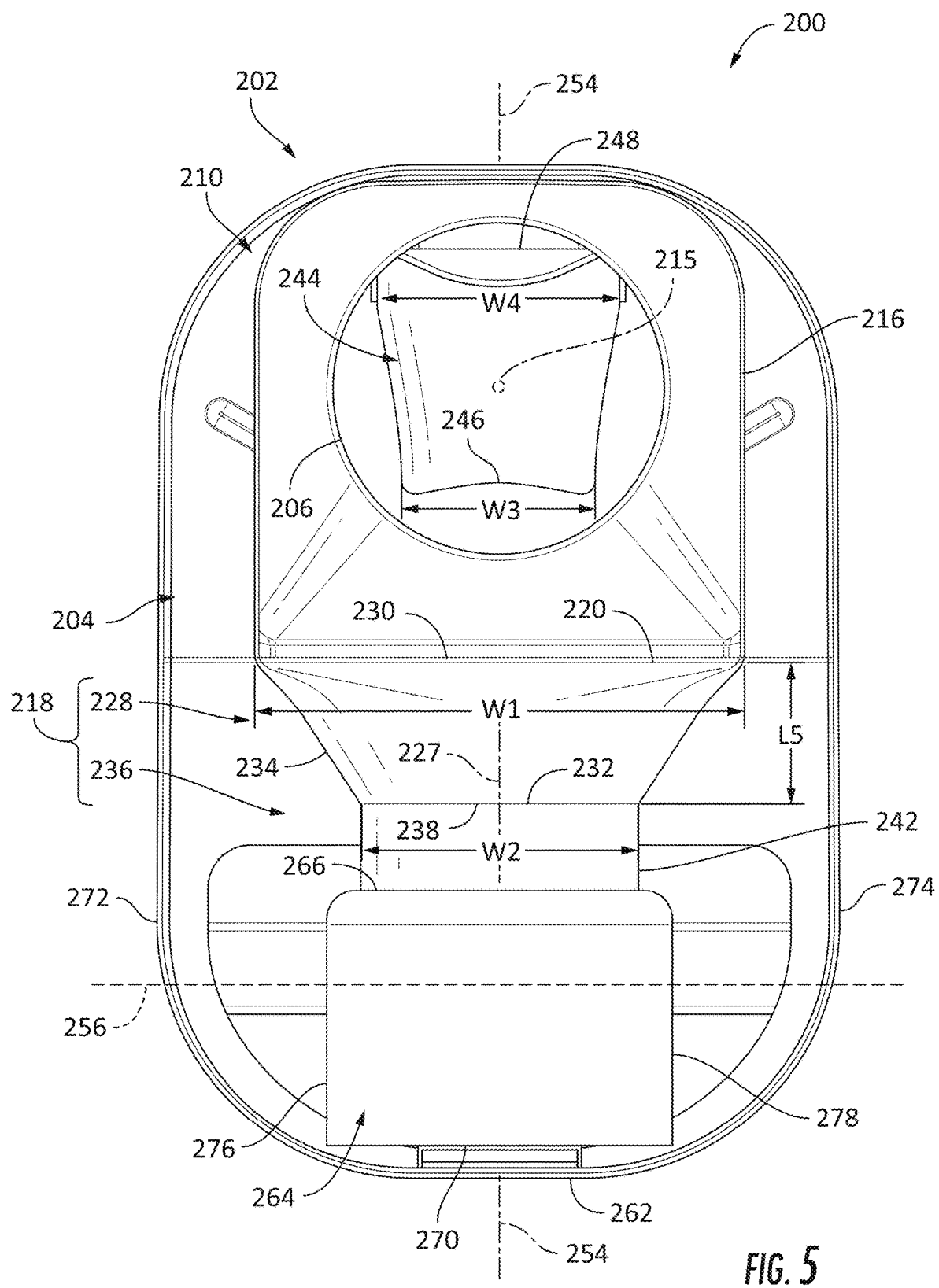
FIG. 5 is a cross-sectional view of the portion of the exhaust aftertreatment system of FIG. 2 taken along plane 5-5 in FIG. 2.

As illustrated in FIG. 5, the housing 202 further includes a third wall 272 and a fourth wall 274 opposite the third wall 272. The third wall 272 and the fourth wall 274 may be perpendicular to the first wall 260 and the second wall 262. The second guide wall 264 includes a first edge 276 extending from the second guide wall first end 266 to the second guide wall second end 268. The first edge 276 may face the third wall 272. The second guide wall 264 further includes a second edge 278 opposite the first edge 276 and extending from the second guide wall first end 266 to the second guide wall second end 268. The second edge 278 may face the fourth wall 274. In some embodiments, a first gap is disposed between the first edge 276 and the third wall 272, such that the first edge 276 and the third wall 272 do not contact. In some embodiments, a second gap is disposed between the second edge 278 and the fourth wall 274, such that second edge 278 and the fourth wall 274 do not contact. The first gap disposed between the first edge 276 and the third wall 272 and/or the second gap disposed between the second edge 278 and the fourth wall 274 may encourage mixing of the exhaust and the treatment fluid by generating or increasing turbulent flow.

As illustrated in FIG. 4, the extended body first end 220 is separated from the second guide wall second end 268 by a sixth length L6. The sixth length L6 is a shortest length between the extended body first end 220 and the second guide wall second end 268 in a direction parallel to the extended body central axis 227. In some embodiments, the sixth length L6 is in a range of 250 mm to 330 mm, and more preferably 270 mm to 310 mm. The second end portion 226 of the extended body second end 222 is separated from the second guide wall second end 268 by a seventh length L7. The seventh length L7 is a shortest length between the extended body second end 222 and the second guide wall second end 268 in a direction parallel to the extended body central axis 227. In some embodiments, the seventh length L7 is in a range of 60 mm to 140 mm, and more preferably 80 mm to 120 mm. The seventh length L7 (e.g., the length between second end portion 226 of the extended body second end 222 and the second guide wall second end 268) is sufficiently large to prevent backflow of the exhaust and the treatment fluid, thereby reducing backpressure, and sufficiently small to allow for a compact size of the mixing body assembly 200.

It is to be appreciated that the mixing body assembly 200 and/or its components (e.g., the mixing inlet body 210, the inlet body 212, the transfer body 216, the extended body 218, etc.) may be manufactured (e.g., created, built, etc.) through various conventional methods, such as Mannesmann plug mill process, Mandrel mill process, extrusion process, forging (e.g., forged seamless pipe manufacturing process, etc.), welding (e.g., welded pipe manufacturing process, etc.), casting, drawing, forming, machining, cutting, punching, stamping, and 3D printing.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, treatment fluid, an air-treatment fluid mixture, exhaust, hydrocarbon fluid, an air-hydrocarbon fluid mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A mixing body assembly for an exhaust aftertreatment system, the mixing body assembly comprising:
a housing defining an internal volume, the housing comprising:
a housing inlet, and
a housing outlet; and
a mixing inlet body comprising:
an inlet body extending through the housing inlet, the inlet body configured to be coupled to an exhaust conduit, the inlet body comprising an inlet body inlet configured to receive exhaust from the exhaust conduit,
a transfer body disposed within the internal volume and coupled to the inlet body and configured to receive the exhaust from the inlet body and treatment fluid from an injector of a dosing module, and
an extended body disposed within the internal volume and coupled to the transfer body and configured to receive the exhaust and the treatment fluid from the transfer body, the extended body comprising:
an extended body first end located at the transfer body,
an extended body second end opposite the extended body first end, the extended body second end having a first end portion and a second end portion, the first end portion separated from the extended body first end by a first length, the second end portion separated from the extended body first end by a second length that is greater than the first length, the second end portion is positioned between the first end portion and the housing outlet,
a tapered portion configured to receive the exhaust and the treatment fluid from the transfer body, the tapered portion comprising:
a tapered portion first end having a first width,
a tapered portion second end opposite the tapered portion first end, the tapered portion second end having a second width that is less than the first width, and
a tapered portion body extending between the tapered portion first end and the tapered portion second end; and
a straight portion configured to receive the exhaust and the treatment fluid from the tapered portion, the straight portion comprising:
a straight portion first end located at the tapered portion second end,
a straight portion second end opposite the straight portion first end, and
a straight portion body extending between the straight portion first end and the straight portion second end.

2. The mixing body assembly of claim 1, wherein the straight portion first end has the second width.

3. The mixing body assembly of claim 1, wherein the first width is in a range between 110% of the second width and 200% of the second width.

4. The mixing body assembly of claim 1, wherein the tapered portion body and the straight portion body are coaxial.

5. The mixing body assembly of claim 1, wherein:
the straight portion first end has a third width;
the straight portion second end has a fourth width; and
the third width is equal to the fourth width.

6. The mixing body assembly of claim 1, further comprising a flange coupled to the housing and the extended body at the extended body first end.

7. The mixing body assembly of claim 1, wherein the straight portion first end is separated from the first end portion by a third length and the straight portion first end is separated from the second end portion by a fourth length, the fourth length greater than the third length.

8. The mixing body assembly of claim 7, wherein the tapered portion first end is separated from the tapered portion second end by a fifth length, the fifth length greater than the third length and lesser than the fourth length.

9. The mixing body assembly of claim 1, wherein:
the inlet body is centered on an inlet body central axis;
the extended body is centered on an extended body central axis;
the inlet body central axis and the extended body central axis extend along a first reference plane;
the first reference plane is orthogonal to a second reference plane that is parallel to the inlet body central axis; and
the extended body second end is disposed along an outlet plane that is separated from the second reference plane by an acute angle.

10. The mixing body assembly of claim 9, wherein the inlet body central axis is orthogonal to the extended body central axis.

11. The mixing body assembly of claim 1, further comprising a guide wall disposed in the internal volume, the guide wall configured to receive the exhaust and the treatment fluid from the extended body and direct the exhaust and the treatment fluid toward the housing outlet.

12. The mixing body assembly of claim 11, wherein:
the housing further comprises:
a first wall substantially coplanar to the housing inlet, and
a second wall perpendicular to the first wall; and
the guide wall comprises a guide wall first end coupled to the first wall and a guide wall second end coupled to the second wall.

13. The mixing body assembly of claim 12, wherein:
the housing further comprises a third wall perpendicular to the first wall and the second wall;
the guide wall comprises an edge extending from the guide wall first end to the guide wall second end, the edge faces the third wall; and
the mixing body assembly further comprises a gap disposed between the edge and the third wall such that the edge and the third wall do not contact.

14. An exhaust aftertreatment system, comprising:
the mixing body assembly of claim 1; and
a dosing module coupled to the housing, the dosing module comprising an injector configured to inject treatment fluid into the transfer body, the injector extends through the housing and the transfer body.

15. A mixing body assembly for an exhaust aftertreatment system, the mixing body assembly comprising:
a housing defining an internal volume, the housing comprising:
a housing inlet, and
a housing outlet;
a mixing inlet body comprising:
an inlet body extending through the housing inlet, the inlet body configured to be coupled to an exhaust conduit, the inlet body comprising an inlet body inlet configured to receive exhaust from the exhaust conduit,
a transfer body disposed within the internal volume and coupled to the inlet body and configured to receive the exhaust from the inlet body and treatment fluid from an injector of a dosing module, and
an extended body disposed within the internal volume and coupled to the transfer body and configured to receive the exhaust and the treatment fluid from the transfer body, the extended body comprising:
an extended body first end located at the transfer body, and
an extended body second end opposite the extended body first end, the extended body second end having a first end portion and a second end portion, the first end portion separated from the extended body first end by a first length, the second end portion separated from the extended body first end by a second length that is greater than the first length, the second end portion is positioned between the first end portion and the housing outlet; and
a guide wall disposed in the transfer body proximate to the housing inlet, the guide wall comprising:
a guide wall first end separated from the housing inlet by a first distance, the guide wall first end having a first width, and
a guide wall second end separated from the housing inlet by a second distance, the second distance greater than the first distance, the guide wall second end having a second width greater than the first width.

16. The mixing body assembly of claim 15, wherein a portion of the guide wall has a semi-circular cross-section.

17. The mixing body assembly of claim 15, wherein:
the guide wall first end is separated from the extended body first end by a third distance;
the guide wall second end is separated from the extended body first end by a fourth distance; and
the third distance is less than the fourth distance.

18. A mixing body assembly for an exhaust aftertreatment system, the mixing body assembly comprising:
a housing defining an internal volume; and
a mixing inlet body comprising:
an inlet body configured to be coupled to an exhaust conduit and receive exhaust from the exhaust conduit, the inlet body extends away from the internal volume, the inlet body centered on an inlet body central axis that extends along a first reference plane,
a transfer body disposed within the internal volume and coupled to the inlet body and configured to receive the exhaust from the inlet body and treatment fluid from an injector of a dosing module, and
an extended body disposed within the internal volume and coupled to the transfer body and configured to receive the exhaust and the treatment fluid from the transfer body, the extended body centered on an extended body central axis that extends along the first reference plane, the extended body comprising:

an extended body first end located at the transfer body, an extended body second end opposite the extended body first end, the extended body second end disposed along an outlet plane that is separated from a second reference plane by an acute angle, the second reference plane being parallel to the inlet body central axis and orthogonal to the first reference plane, a tapered portion configured to receive the exhaust and the treatment fluid from the transfer body, the tapered portion comprising:
  a tapered portion first end having a first width,
  a tapered portion second end opposite the tapered portion first end, the tapered portion second end having a second width that is less than the first width, and
  a tapered portion body extending between the tapered portion first end and the tapered portion second end; and a straight portion configured to receive the exhaust and the treatment fluid from the tapered portion, the straight portion comprising:
  a straight portion first end located at the tapered portion second end,
  a straight portion second end opposite the straight portion first end, and
  a straight portion body extending between the straight portion first end and the straight portion second end.

19. A mixing inlet body for an exhaust aftertreatment system, the mixing inlet body comprising:

an inlet body configured to be coupled to an exhaust conduit, the inlet body comprising an inlet body inlet configured to receive exhaust from the exhaust conduit;

a transfer body coupled to the inlet body and configured to receive the exhaust from the inlet body and treatment fluid from an injector of a dosing module;

a tapered portion coupled to the transfer body, the tapered portion configured to receive the exhaust and the treatment fluid from the transfer body; and a straight portion coupled to the tapered portion, the straight portion configured to receive the exhaust and the treatment fluid from the tapered portion, the straight portion comprising:
  a straight portion first end located at the tapered portion, and
  a straight portion second end opposite the straight portion first end, the straight portion second end being angled relative to the straight portion first end.

20. A mixing body assembly for an exhaust aftertreatment system, the mixing body assembly comprising:

a housing defining an internal volume, the housing comprising:
  a housing inlet, and
  a housing outlet;

a mixing inlet body comprising:
  an inlet body configured to be coupled to an exhaust conduit and receive exhaust from the exhaust conduit, the inlet body extends away from the internal volume, the inlet body centered on an inlet body central axis that extends along a first reference plane,
  a transfer body disposed within the internal volume and coupled to the inlet body and configured to receive the exhaust from the inlet body and treatment fluid from an injector of a dosing module, and
  an extended body disposed within the internal volume and coupled to the transfer body and configured to receive the exhaust and the treatment fluid from the transfer body, the extended body centered on an extended body central axis that extends along the first reference plane, the extended body comprising:
    an extended body first end located at the transfer body, and
    an extended body second end opposite the extended body first end, the extended body second end disposed along an outlet plane that is separated from a second reference plane by an acute angle, the second reference plane being parallel to the inlet body central axis and orthogonal to the first reference plane; and a guide wall disposed in the transfer body proximate to the housing inlet, the guide wall comprising:
  a guide wall first end separated from the housing inlet by a first distance, the guide wall first end having a first width, and
  a guide wall second end separated from the housing inlet by a second distance, the second distance greater than the first distance, the guide wall second end having a second width greater than the first width.

21. A mixing body assembly for an exhaust aftertreatment system, the mixing body assembly comprising:

a housing defining an internal volume, the housing comprising:
  a housing inlet,
  a housing outlet
  a first wall substantially coplanar to the housing inlet, and
  a second wall perpendicular to the first wall;

a mixing inlet body comprising:
  an inlet body extending through the housing inlet, the inlet body configured to be coupled to an exhaust conduit, the inlet body comprising an inlet body inlet configured to receive exhaust from the exhaust conduit,
  a transfer body disposed within the internal volume and coupled to the inlet body and configured to receive the exhaust from the inlet body and treatment fluid from an injector of a dosing module, and
  an extended body disposed within the internal volume and coupled to the transfer body and configured to receive the exhaust and the treatment fluid from the transfer body, the extended body comprising:
    an extended body first end located at the transfer body,
    an extended body second end opposite the extended body first end, the extended body second end having a first end portion and a second end portion, the first end portion separated from the extended body first end by a first length, the second end portion separated from the extended body first end by a second length that is greater than the first length, the second end portion is positioned between the first end portion and the housing outlet; and a guide wall disposed in the internal volume, the guide wall configured to receive the exhaust and the treatment fluid from the extended body and direct the exhaust and the treatment fluid toward the housing outlet, wherein the guide wall comprises a guide wall first end coupled to the first wall and a guide wall second end coupled to the second wall.

* * * * *